United States Patent Office 2,764,561
Patented Sept. 25, 1956

2,764,561

RESINOUS INSOLUBLE VINYL AROMATIC CO-POLYMER CONTAINING PHOSPHONATE GROUPS AND SULFONATE GROUPS

Elmer L. McMaster and William K. Glesner, Midland, Mich., assignors to The Dow Chemical Company, Midland, Mich., a corporation of Delaware No Drawing. Application November 2, 1954,
Serial No. 466,456

9 Claims. (Cl. 260—2.2)

This invention concerns the acidic and salt forms of certain new cation exchange resins. It relates more particularly to resinous compositions comprising insoluble cross-linked vinyl aromatic copolymers, which copolymers contain as substituents on aromatic nuclei thereof, both methylene phosphonate groups and sulfonate groups. The invention also concerns a method of making the resinous compositions.

Phosphonic acid cation exchange resins and sulfonic acid cation exchange resins are known. For example, it is known to sulfonate a vinyl aromatic copolymer, e. g. a copolymer of styrene and divinylbenzene, or a copolymer of styrene, ethylvinylbenzene and divinylbenzene, whereby a resinous insoluble composition containing sulfonic acid groups on aromatic nuclei of the copolymer is formed.

However, it has not heretofore been proposed to prepare resinous insoluble compositions comprising cross-linked vinyl aromatic copolymers which copolymers contain as substituents on aromatic nuclei thereof, both methylene phosphonate groups and sulfonate groups, i. e. methylene phosphonic acid groups, and sulfonic acid groups or salts of said acid groups, on aromatic nuclei of the same copolymer molecule. The terms "phosphonate group" and "sulfonate group" employed herein pertain to the phosphonic acid group and the sulfonic acid groups, respectively, and the corresponding phosphonate salt group and the sulfonate salt group.

It is a primary object of the invention to provide resinous compositions suitable for the removal of cations from fluids, which compositions are insoluble cross-linked vinyl aromatic copolymers containing as substituents on aromatic nuclei thereof, both methylene phosphonate groups and sulfonate groups on aromatic nuclei of the same copolymer molecule. Another object is to provide a method of making such resinous insoluble compositions of matter. A further object is to introduce sulfonic acid groups into aromatic nuclei of an insoluble cross-linked vinyl aromatic copolymer, which copolymer contains as substituents on aromatic nuclei thereof, methylene phosphonic acid groups. Other and related objects may appear from the following description of the invention.

According to the invention the foregoing and related objects are attained by introducing sulfonic acid groups on aromatic nuclei of an insoluble cross-linked vinyl aromatic copolymer which copolymer contains on the aromatic nuclei substituent methylene phosphonic acid groups of the formula —CH$_2$P(O)(OH)$_2$, by reacting the finely-divided copolymer with a sulfonating agent, e. g. chlorosulfonic acid.

The new resinous compositions are the reaction product of a sulfonating agent such as chlorosulfonic acid, sulfuric acid, or sulfur trioxide, and an insoluble cross-linked copolymer of one or more monovinyl aromatic compounds and a divinyl aromatic hydrocarbon, e. g. divinylbenzene, which copolymer contains as substituents on the aromatic nuclei thereof, an average of at least 0.5, preferably from two to ten methylene phosphonic acid groups for every ten aromatic nuclei in the copolymer.

The compositions can be prepared by first forming an insoluble cross-linked copolymer of one or more monovinyl aromatic hydrocarbons of the benzene series, or nuclear chlorinated derivatives thereof, and a divinyl aromatic hydrocarbon such as divinylbenzene, divinyltoluene, divinylxylene, or ethylvinylbenzene. Chloromethyl groups are introduced as substituents on aromatic nuclei of the finely-divided copolymer. The chloromethyl groups are reacted with a trialkyl phosphite. Chlorine is thereby displaced from the chloromethyl radicals and a polymeric composition containing methylene dialkyl phosphonate groups as substituents on aromatic nuclei of the copolymer molecule is formed. This polymeric composition is hydrolyzed to convert the dialkyl phosphonate radicals to the phosphonic acid radicals. The copolymer containing methylene phosphonic acid groups on its aromatic nuclei is reacted with a sulfonating agent, e. g. chlorosulfonic acid, whereby sulfonic acid groups are introduced onto aromatic nuclei of the copolymer molecule.

The insoluble cross-linked vinyl aromatic copolymer starting material can be a copolymer of from 80 to 99.5 per cent by weight of one or more monovinyl aromatic compounds such as monovinyl aromatic hydrocarbons of the benzene series, or nuclear chlorinated derivatives thereof, and from 20 to 0.5 per cent of one or more divinyl aromatic hydrocarbons. The monovinyl aromatic compound may contain in addition to the vinyl radical directly attached to a carbon atom of the aromatic nucleus a total of from 1 to 2 chlorine atoms, or lower alkyl radicals, each containing from 1 to 3 carbon atoms as nuclear substituents. Examples of suitable monovinyl aromatic compounds are styrene, vinyltoluene, vinylxylene, ethylvinylbenzene, isopropylvinylbenzene, ethylvinyltoluene, chlorostyrene, dichlorostyrene, or ar-chlorovinyltoluene. Examples of suitable divinyl aromatic hydrocarbons are divinylbenzene, divinyltoluene, divinylxylene, or ethyldivinylbenzene. Copolymers of at least 80 per cent by weight of styrene, a lesser amount of ethylvinylbenzene, and from 0.5 to 10 per cent of divinylbenzene are preferred.

The copolymers can be prepared by any of a variety of well-known methods employed for the polymerization of styrene. A mixture of the monomeric materials can be polymerized in bulk, i. e. in the substantial absence of an inert liquid medium, or while dispersed in an aqueous emulsion or suspension of an inert non-solvent medium. Suspension methods wherein a mixture of the monomeric materials is dispersed in a liquid non-solvent medium such as water or brine and are then heated, agitated and copolymerized, are preferred because such methods form hard copolymer particles in the form of spheroids, beads, or rounded granules, and the size of the particles can readily be controlled.

The polymerization of the vinyl aromatic compounds is accelerated by means of catalysts which provide oxygen, e. g. benzoyl peroxide, di-tertiary-butyl peroxide, di-tertiary-butyl diperphthalate, hydrogen peroxide, or the so-colled "per" salts such as sodium persulfate, or potassium persulfate. The catalysts are employed in suitable amounts ranging from 0.1 to 2 per cent by weight or more, based on the weight of the monomeric materials to be polymerized.

Chloromethyl groups are introduced into the insoluble cross-linked copolymer by reacting the finely-divided copolymer with a chloromethylating agent such as a mixture of paraformaldehyde and hydrogen chloride, or chloromethyl methyl ether and a Friedel-Crafts catalyst, e. g. zinc chloride, stannic chloride, or aluminum chloride. Methods of chloromethylating which may be used for introducing the chloromethyl group onto aromatic nuclei of the copolymer are described in "Organic Reactions," vol. 1, chapter 3, page 63 (John Wiley & Sons Inc., New York city). The chloromethylation reaction is preferably carried out by treating the copolymer in the form of small particles with chloromethyl methyl ether and a Friedel-Crafts catalyst at temperatures between 20° and 60° C.

The extent of the chloromethylation can be conveniently determined by analysis. It is desirable that as many chloromethyl groups as possible be introduced into the insoluble cross-linked copolymer because the number of such groups determines the number of phosphonic acid groups in the final product. The chloromethylation reaction is usually continued until the copolymer contains at least two, preferably from two to ten chloromethyl groups for every ten aromatic nuclei in the copolymer.

An alternate procedure for preparing insoluble cross-linked vinyl aromatic copolymers containing chloromethyl radicals on aromatic nuclei of the copolymer is to first prepare a resinous copolymer of one or more ar-methyl monovinyl aromatic compounds such as vinyltoluene, vinylxylene, or ar-chlorovinyltoluene, cross-linked with from 0.5 to 20 per cent by weight of a divinyl aromatic hydrocarbon, e. g. divinylbenzene, by polymerizing a mixture of the monomeric materials in usual ways. The insoluble copolymer in the form of small particles is reacted with chlorine in the presence of a side chain halogenation catalyst, whereby a chlorine atom is substituted for a hydrogen atom on methyl radicals in the copolymer.

Chlorination of the insoluble cross-linked copolymers, of monovinyl aromatic compounds having in addition to the vinyl radical from one to two methyl radicals directly attached to carbon atoms of the aromatic nucleus, can readily be carried out by treating the finely-divided copolymer with chlorine at temperatures between −10° and 150° C. in the presence of a halogenation catalyst such as phosphorus, phosphorus trichloride, ultraviolet light, or a combination of light and phosphorus trichloride, promoting substitution of the chlorine for hydrogen attached to carbon atoms of the methyl radicals on aromatic nuclei in the copolymer. The chlorination is usually carried out while the insoluble copolymer particles are dispersed in, and swollen by, an organic liquid such as carbon tetrachloride, benzene, chlorobenzene, acetic acid, or ortho-dichlorobenzene, and at atmospheric or substantially atmospheric pressure.

The chlorination reaction is usually accompanied, at least to some extent, by substitution of chlorine atoms on aromatic nuclei in the copolymer, but such nuclear chlorination is not disadvantageous. The insoluble cross-linked copolymer is usually reacted with from 0.5 to 2 gram molecular proportions of chlorine for each gram radical weight of methyl radicals on aromatic nuclei in the copolymer. The extent of the chlorination can be conveniently determined by analysis. Such chlorinated insoluble cross-linked copolymers containing at least 0.5, preferably an average of from two to ten, chloromethyl groups for every ten aromatic nuclei in the copolymer can be employed as starting materials in preparing the resinous compositions of the invention.

The next step in preparing the resinous compositions of the invention is the substitution of a phosphonate group for the chlorine atom in the chloromethyl groups on aromatic nuclei in the copolymer. The copolymer containing chloromethyl groups on the aromatic nuclei is reacted with a trialkyl phosphite. Chlorine is thereby displaced from the chloromethyl groups and a polymeric composition containing methylene dialkyl phosphonate groups as substituents on aromatic nuclei of the polymer molecule is formed. This polymeric composition is hydrolyzed to convert the dialkyl phosphonate groups to the phosphonic acid radicals.

The trialkyl phosphite starting material can be a tertiary alkyl phosphite of the formula $P(OR)_3$ wherein R represents an alkyl radical containing from one to eight carbon atoms. Examples of suitable trialkyl phosphites are trimethyl phosphite, triethyl phosphite, triisopropyl phosphite, tributyl phosphite, or triisooctyl phosphite.

The reaction of the trialkyl phosphite with the insoluble cross-linked vinyl aromatic copolymer containing chloromethyl radicals on its aromatic nuclei can be carried out at temperatures between about 100° and 200° C., preferably from 140° to 180° C., at atmospheric or substantially atmospheric pressure. The reaction can be carried out while the finely-divided copolymer is dispersed in, or swollen by, an organic liquid such as toluene, xylene, ethylbenzene, chlorobenzene, or ortho-dichlorobenzene. The trialkyl phosphites also swell the copolymers. Thus, the reaction is preferably carried out by dispersing small particles of the copolymer in an amount of the trialkyl phosphite sufficient to form a slurry or dispersion which can conveniently be stirred and employing the trialkyl phosphite as both reactant and reaction medium. The reaction is usually carried out by heating a mixture of the copolymer and the trialkyl phosphite at a reflux temperature at atmospheric pressure or thereabout. The treated copolymer is separated from the liquid by filtering. It may be washed with an organic liquid such as toluene, diethyl ether, or acetone, or washed with water, to free the copolymer from the unreacted trialkyl phosphite. The polymeric material containing methylene dialkyl phosphonate groups on aromatic nuclei of the copolymer is subjected to hydrolysis to convert the dialkyl phosphonate radicals to the phosphonic acid radicals, by heating with an aqueous solution of a hydrohalic acid, e. g. an aqueous solution containing 20 per cent by weight or more of hydrochloric or hydrobromic acid, or with an aqueous solution of an alkali such as sodium hydroxide or potassium hydroxide. The hydrolysis reaction is readily carried out by heating the insoluble copolymer containing the methylene dialkyl phosphonate radicals on its aromatic nuclei in admixture with an aqueous solution of an acid or an alkali at temperatures between 100° and 140° C. and at atmospheric or superatmospheric pressure. Hydrolysis of the dialkyl phosphonate radical is preferably carried out by suspending the phosphorated copolymer particles in an aqueous solution of hydrochloric or hydrobromic acid and heating the mixture at refluxing temperature at atmospheric pressure. The product is separated and washed with water. The product is obtained in the hydrogen, i. e. the phosphonic acid, form, or the salt form, depending upon whether an acid, or an alkali, is employed in the hydrolysis of the dialkyl phosphonate radicals.

The insoluble cross-linked copolymers containing methylene phosphonic acid groups as substituents on aromatic nuclei thereof, in amount corresponding to at least 0.5, preferably from 2 to 10, of said groups for every 10 aromatic nuclei in the copolymer, are next reacted with a sulfonating agent such as chlorosulfonic acid, sulfuric acid, or sulfur trioxide, whereby sulfonic acid groups are substituted on aromatic nuclei in the copolymer.

The reaction of a sulfonating agent with the copolymer containing methylene phosphonic acid groups on its aromatic nuclei is usually carried out while the finely-divided copolymer is dispersed in and swollen by a liquid aliphatic polyhalohydrocarbon such as methylene chloride, carbon tetrachloride, chloroform, 1,1,1-trichloroethane, tetrachloroethane, or ethylene dichloride, or a liquid mixture of from 20 to 80 per cent by weight of sulfur dioxide and from 80 to 20 per cent of one or more of said aliphatic polychlorohydrocarbons. The liquid medium is employed in amount sufficient to form a slurry or dispersion of the copolymer particles which can conveniently be stirred.

The sulfonation reaction can be carried out at temperatures between −20° and 150° C. employing sulfuric acid, sulfur trioxide, or chlorosulfonic acid, as the sulfonating agent and at atmospheric, or superatmospheric pressures sufficient to maintain the reaction medium in a liquid condition at the temperatures employed. It may be mentioned that higher reaction temperatures, e. g. temperatures between 100° and 150° C., are required, when employing sulfuric acid as the sulfonating agent, than are required when using sulfur trioxide, or chlorosulfonic acid.

Sulfonation of the insoluble cross-linked copolymer containing substituent methylene phosphonic acid groups on its aromatic nuclei, i. e. the phosphonic acid cation exchange resin, is preferably carried out by suspending the finely-divided copolymer in a dry or substantially anhydrous condition, in a substantially anhydrous liquid reaction medium consisting of one or more polychlorinated aliphatic hydrocarbons selected from the group consisting of methylene chloride, carbon tetrachloride, chloroform, 1,1,1-trichloroethane, tetrachloroethane and ethylene dichloride, which organic liquid swells the copolymer, and reacting the swollen copolymer particles with chlorosulfonic acid at temperatures between −20° and 60° C. at atmospheric pressure or thereabout.

The sulfonating agent is usually employed in amount corresponding to about that required to theoretically introduce from one to four sulfonic acid groups per aromatic nucleus in the copolymer, preferably in amount corresponding to from two to four gram molecular proportions of the sulfonating agent per gram molecular equivalent aromatic nucleus in the copolymer.

The sulfonation reaction is continued until the copolymer contains as substituents on aromatic nuclei thereof, an average of at least two, preferably from four to twelve, substituent sulfonic acid groups for every ten aromatic nuclei in the copolymer.

After completing the sulfonation reaction the copolymer product is separated from the liquid reaction medium in usual ways, e. g. by filtering. The final product is usually washed with water and is in a form suitable for the removal of cations from fluids.

The resinous insoluble compositions of the invention containing as substituents on aromatic nuclei thereof, both methylene phosphonic acid groups and sulfonic acid groups directly attached to carbon atoms of aromatic nuclei in the same insoluble cross-linked vinyl aromatic copolymer, exhibit unusually high capacity for sorbing cations from fluids. Materials prepared in accordance with the invention are capable of repeated use and regeneration in sorbing cations from aqueous solutions. The preparation of cation exchange resins containing both methylene phosphonate groups and sulfonate groups as substituents on aromatic nuclei of insoluble cross-linked vinyl aromatic copolymers as herein described permits the production of ion exchange resins having a greater total number of ion active groups or radicals, and correspondingly greater ion exchange capacity, than has heretofore been obtained by the introduction of methylene phosphonate groups or sulfonate groups, alone, onto aromatic nuclei of similar cross-linked insoluble vinyl aromatic copolymers.

The following example illustrates a way in which the principle of the invention has been applied, but is not to be construed as limiting its scope.

*Example*

(A) A charge of 100 parts by weight of an insoluble cross-linked copolymer of 87.5 per cent by weight of styrene, 5 per cent ethylvinylbenzene and 7.5 per cent divinylbenzene, in the form of beads of sizes between 20 and 50 mesh per inch as determined by U. S. Standard screens, was placed in a reaction vessel equipped with a stirrer and means for heating, or cooling, the vessel and its contents. A charge of 250 parts of chloromethyl methyl ether and 75 parts of perchloroethylene was added. The mixture was stirred at room temperature for 30 minutes. Thereafter, 50 parts of anhydrous zinc chloride was added with continued stirring over a period of about two hours, while maintaining the mixture at temperatures between 40° and 60° C. The mixture was stirred and maintained at reaction temperatures between 40° and 60° C. for a period of 2 hours after addition of the zinc chloride. Thereafter, water was slowly added to decompose the unreacted chloromethyl methyl ether and the catalyst. The mixture was stirred for about one hour and was filtered. The copolymer beads were washed with water and dried. The beads contained 15.27 per cent by weight of chlorine by analysis. (B) A charge of 800 cc. of the chloromethylated copolymer beads prepared in part (A) above was placed in a five liter three necked balloon flask equipped with a reflux condenser and stirrer. A charge of 2000 grams of triethyl phosphite was added. The mixture was stirred and heated at temperatures between 150° and 155° C. for a period of 5 hours, then cooled. The beads were separated by filtering and were washed with water, then with acetone and again washed with water. The washed beads were placed in the reaction flask, together with 800 cc. of an aqueous 30 weight per cent solution of hydrobromic acid. The mixture was stirred and heated at a refluxing temperature for a period of two hours, then cooled. The copolymer beads were separated by filtering and were washed with water, then with acetone and were dried. The dried copolymer beads had a cation exchange capacity of 4.6 milliequivalents of sodium hydroxide per gram of the resin, and contained an average of about 4.5 phosphonic acid groups for every 10 aromatic nuclei in the copolymer. The water-swelled beads in the hydrogen form had a cation exchange capacity corresponding to 47,000 grains of calcium carbonate per cubic foot of a bed of the resin particles. (C) A charge of 312 grams (400 cc.) of the dried copolymer beads containing substituent methylene phosphonic acid groups on the aromatic nuclei prepared in part (B) above was placed in a glass vessel equipped with a reflux condenser and stirrer. A charge of 1000 cc. of methylene chloride was added. The mixture was stirred at temperatures between 25° and 31° C. over a period of 1.5 hours to swell the beads. Thereafter, 320 grams of chlorosulfonic acid was added in small portions over a period of about 4 hours while stirring and maintaining the mixture at temperatures between 35° and 38° C. The mixture was stirred and heated at temperatures between 35° and 38° C. for a period of 12 hours longer. The mixture was poured into ice-water to decompose the unreacted chlorosulfonic acid. After stirring for about 15 minutes, the beads were separated by filtering and were washed with water, then with acetone, and again washed with water. A portion of the product was dried. It had a cation exchange capacity of 6.87 milliequivalents of sodium hydroxide per gram of the resin. The final copolymer product contained in addition to the substituent methylene phosphonic acid group on aromatic nuclei thereof, about 6.3 substituent sulfonic acid groups for every 10 aromatic nuclei in the copolymer and had a cation exchange capacity corresponding to 86,800 grains of calcium carbonate per cubic foot of a bed of the resin particles.

We claim:

1. An insoluble resinous composition, suitable for the removal of cations from fluids, comprising an insoluble copolymer of from 80 to 99.5 per cent by weight of at least one monovinyl aromatic compound selected from the group consisting of monovinyl aromatic hydrocarbons of the benzene series and nuclear halogenated derivatives thereof, and from 20 to 0.5 per cent of at least one divinyl aromatic hydrocarbon, the said copolymer containing as substituents on aromatic nuclei thereof at least 0.5 phosphonate group and at least two sulfonate groups per ten aromatic nuclei.

2. An insoluble resinous composition, suitable for the removal of cations from fluids which comprises an insoluble cross-linked copolymer of a mixture of from 80 to 99.5 per cent by weight of at least one monovinyl aromatic compound selected from the group consisting of monovinyl aromatic hydrocarbons of the benzene series and nuclear chlorinated derivatives thereof, and from 20 to 0.5 per cent by weight of a divinyl aromatic hydrocarbon, the said copolymer containing as substituents on aromatic nuclei thereof at least two methylene phosphonate groups and at least two sulfonate groups per ten aromatic nuclei.

3. An insoluble resinous composition as claimed in claim 2, wherein the number of the substituent methylene phosphonate groups is between 2 and 10, and the number of the substituent sulfonate groups is between 2 and 12 for every 10 aromatic nuclei in the copolymer.

4. An acidic form of an insoluble resinous composition as claimed in claim 2, wherein at least part of the phosphonate groups are phosphonic acid groups and at least part of the sulfonate groups are sulfonic acid groups.

5. An insoluble resinous composition as claimed in claim 2, which comprises an insoluble cross-linked copolymer of at least 80 per cent by weight of styrene, a lesser amount of ethylvinyl benzene, and from 0.5 to 10 per cent of divinylbenzene, having both methylene phosphonate groups and sulfonate groups as substituents on aromatic nuclei of the copolymer molecule.

6. An insoluble resinous composition as claimed in claim 2, which comprises an insoluble cross-linked copolymer containing in chemically combined form from 80 to 99.5 per cent by weight of styrene and from 20 to 0.5 per cent of divinylbenzene, having both methylene phosphonate groups and sulfonate groups as substituents on aromatic nuclei of the copolymer molecule.

7. A method of making an insoluble resinous composition suitable for the removal of cations from fluids, which method comprises reacting a phosphorated insoluble cross-linked copolymer of a mixture of from 80 to 99.5 per cent by weight of at least one monovinyl aromatic compound selected from the group consisting of monovinyl aromatic hydrocarbons of the benzene series and nuclear chlorinated derivatives thereof, and from 20 to 0.5 per cent by weight of a divinyl aromatic hydrocarbon, the said copolymer containing as substituents on aromatic nuclei thereof at least 0.5 methylene phosphonic acid group per ten aromatic nuclei, with a sulfonating agent selected from the group consisting of chlorosulfonic acid, sulfuric acid and sulfur trioxide at reaction temperatures between —20° and 60° C. when the sulfonating agent is a member of the class consisting of chlorosulfonic acid and sulfur trioxide and at reaction temperatures between 100° and 150° C. when the sulfonating agent is sulfuric acid, and in amount corresponding to at least two gram molecular proportions of the sulfonating agent per ten gram molecular equivalent aromatic nuclei in the copolymer, whereby a polymeric composition containing as substituents on aromatic nuclei of the copolymer molecule at least 0.5 methylene phosphonic acid group and at least two substituent sulfonic acid groups per ten aromatic nuclei is formed.

8. A method of making an insoluble resinous composition suitable for the removal of cations from fluids, which method comprises reacting a phosphorated insoluble cross-linked copolymer of a mixture of from 80 to 99.5 per cent by weight of at least one monovinyl aromatic compound selected from the group consisting of monovinyl aromatic hydrocarbons of the benzene series and nuclear chlorinated derivatives thereof, and from 20 to 0.5 per cent by weight of a divinyl aromatic hydrocarbon, the said copolymer containing as substituents on aromatic nuclei thereof between two and then methylene phosphonic acid groups per ten aromatic nuclei with a sulfonating agent selected from the group consisting of chlorosulfonic acid, sulfuric acid and sulfur trioxide at reaction temperatures between —20° and 60° C. when the sulfonating agent is a member of the class consisting of chlorosulfonic acid and sulfur trioxide and at reaction temperatures between 100° and 150° C. when the sulfonating agent is sulfuric acid, and in amount corresponding to at least two gram molecular proportions of the sulfonating agent per ten gram molecular equivalent aromatic nuclei in the copolymer, whereby a polymeric composition containing as substituents on aromatic nuclei of the copolymer molecule between two and ten methylene phosphonic acid groups and between two and twelve substituent sulfonic acid groups per ten aromatic nuclei is formed.

9. A method of making an insoluble resinous composition suitable for the removal of cations from fluids, which method comprises suspending particles of a phosphorated insoluble cross-linked copolymer of a mixture of from 80 to 99.5 per cent by weight of at least one monovinyl aromatic compound selected from the group consisting of monovinyl aromatic hydrocarbons of the benzene series and nuclear chlorinated derivatives thereof, and from 20 to 0.5 per cent by weight of a divinyl aromatic hydrocarbon, the said copolymer containing as substituents on aromatic nuclei thereof between two and ten methylene phosphonic acid groups per ten aromatic nuclei, in a liquid aliphatic polychlorohydrocarbon selected from the group consisting of methylene chloride, carbon tetrachloride, chloroform, 1,1,1-trichloroethane, tetrachloroethane and ethylene dichloride, which is capable of swelling the resin particles and reacting the swollen copolymer with chlorosulfonic acid at reaction temperatures between —20° and 60° C. and in amount corresponding to at least two gram molecular proportions of the chlorosulfonic acid per ten gram molecular equivalent aromatic nuclei in the copolymer, whereby a polymeric composition containing as substituents on aromatic nuclei of the copolymer molecule between two and ten methylene phosphonic acid groups and between two and ten sulfonic acid groups per ten aromatic nuclei is formed.

No references cited.